United States Patent [19]

Shirai et al.

[11] Patent Number: 4,818,733
[45] Date of Patent: Apr. 4, 1989

[54] SILICON NITRIDE SINTERED BODIES AND A METHOD OF PRODUCING THE SAME

[75] Inventors: Masahiro Shirai, Nagoya; Tomonori Takahashi, Chita, both of Japan

[73] Assignee: NGK Insulators, Ltd., Nagoya, Japan

[21] Appl. No.: 28,724

[22] Filed: Mar. 23, 1987

[30] Foreign Application Priority Data

Mar. 28, 1986 [JP] Japan .................................. 61-68287
Mar. 28, 1986 [JP] Japan .................................. 61-68288

[51] Int. Cl.$^4$ ............................................. C04B 35/58
[52] U.S. Cl. ......................................... 501/97; 501/98
[58] Field of Search ..................................... 501/97, 98

[56] References Cited

U.S. PATENT DOCUMENTS 4,280,973 7/1981 Moskowitz et al. ................... 264/65

FOREIGN PATENT DOCUMENTS 0174153 3/1986 European Pat. Off. .............. 501/97
2937740 4/1980 Fed. Rep. of Germany .
3039827 5/1981 Fed. Rep. of Germany .
58-020782 2/1983 Japan .................................. 501/97
60-137873 7/1985 Japan .................................. 501/97
60-186476 9/1985 Japan .................................. 501/97
2032414 5/1980 United Kingdom .

OTHER PUBLICATIONS

Richerson, David W., "Modern Ceramic Engineering", pp. 153 and 170, 1982.

*Primary Examiner*—William R. Dixon, Jr.
*Assistant Examiner*—Anthony J. Green
*Attorney, Agent, or Firm*—Parkhurst, Oliff & Berridge

[57] ABSTRACT

A silicon nitride sintered body having high oxidation resistance and high-temperature strength is produced by starting from silicon nitride powder adjusted so as to have an oxygen content of 4.5–7.5 wt % as converted into $SiO_2$. The sintered body has a molar ratio of metal ion (M) to oxygen ion (O) within a range of M:O = 1.2 ~ 1:3 and contains no crystal of $YSiO_2N$ form.

12 Claims, 2 Drawing Sheets

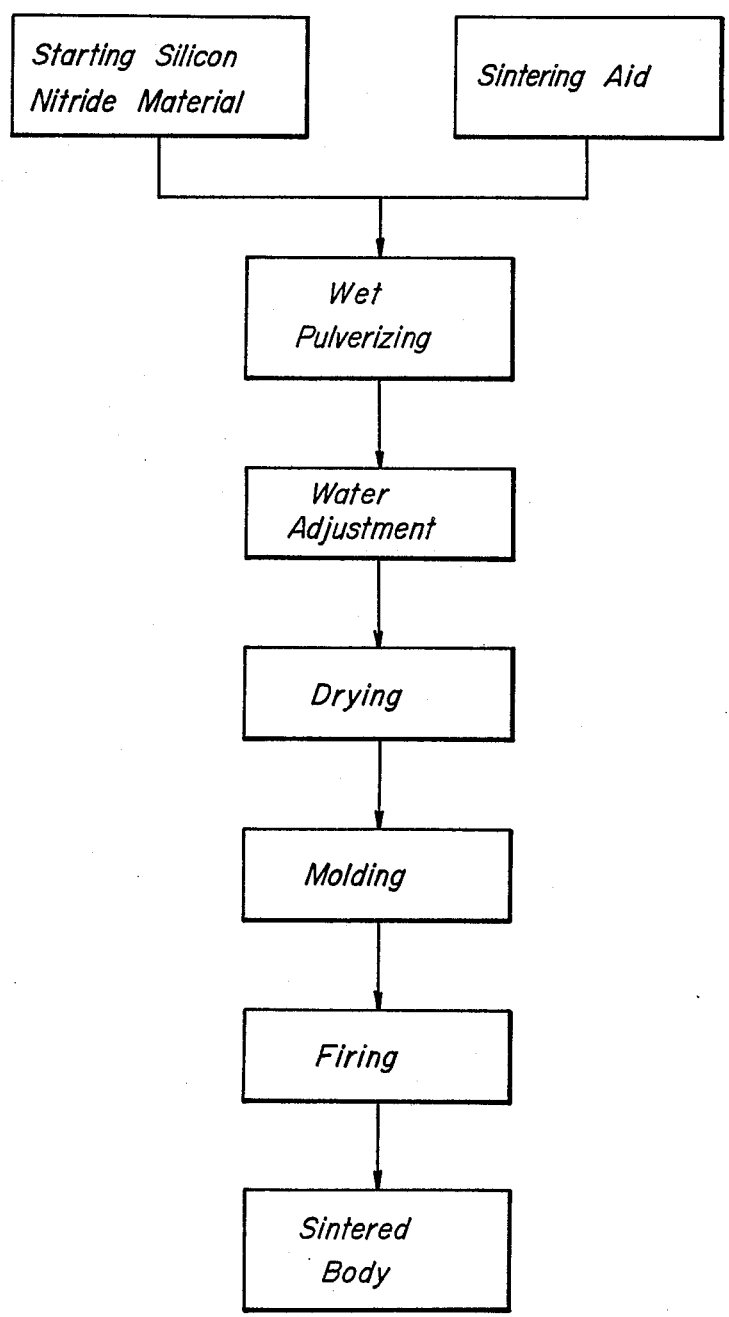

SILICON NITRIDE SINTERED BODIES AND A METHOD OF PRODUCING THE SAME

BACKGROUND OF THE INVENTION

1. Field of the Invention

This invention relates to silicon nitride sintered bodies having an improved oxidation resistance and a method of producing the same and silicon nitride powders used for the production of silicon nitride sintered bodies.

2. Related Art Statement

Heretofore, a method of producing silicon nitride sintered bodies by adding a sintering aid, which forms a liquid phase at grain boundaries, such as $Y_2O_3$, $Al_2O_3$, MgO or the like, to commercially available silicon nitride starting powder, molding the resulting mixture into a given shape and then firing the shaped body in an inert gas atmosphere has hitherto been disclosed, for example, in Japanese Patent Application Publication No. 58-49509.

Such oxide additives, as well as $SiO_2$ originally contained in the starting silicon nitride material and acting as a sintering aid, form glass in the intergranular phase during sintering and are effective for the densification and the formation of microstructure. However, the commercially available silicon nitride powder used as a starting material has generally an oxygen content of 1.2~2.0% by weight (2.2~3.8% by weight as converted into $SiO_2$) and is less in the oxygen content and large in the fluctuation of oxygen content between lots, so that silicon nitride sintered bodies having generally a poor oxidation are frequently obtained.

Lately, there has been a strong demand to provide silicon nitride sintered bodies satisfying both oxidation resistance and high-temperature strength.

SUMMARY OF THE INVENTION

It is, therefore, an object of the invention to solve the aforementioned drawbacks and to provide silicon nitride sintered bodies having high oxidation resistance and high-temperature strength, and a method of producing the same as well as silicon nitride powders used for the production of silicon nitride sintered bodies.

The silicon nitride sintered body according to the invention is produced by using a sintering aid containing Y as an essential component, and has a molar ratio of metal ion (M) except Si contained in the sintered body to oxygen ion (O) within a range of $M:O = 1:2 \sim 1:3$, and is composed of crystals substantially containing no crystalline of $YSiO_2N$ identified by an X-ray diffraction pattern according to JCPDS Card 31-1462.

The production of the silicon nitride sintered body according to the invention comprises the steps of (a) preparing a powdery mixture of silicon nitride powder adjusted so as to have an oxygen content of 4.5-7.5% by weight as converted into $SiO_2$ and a sintering aid containing Y as an essential component;

(b) molding the powdering mixture into a given shape; and (c) firing the shaped body in a nitrogen or inert gas atmosphere to form a sintered body having a molar ratio of metal ion (M) except Si contained in the sintered body to oxygen ion (O) within a range of $M:O = 1:2 \sim 1:3$ and containing substantially no crystalline of $YSiO_2N$ identified by an X-ray diffraction pattern according to JCPDS Card 31-1462.

Further, the silicon nitride powder used in the production of the silicon nitride sintered body according to the invention contains an oxygen content of 4.5-7.5% by weight as converted into $SiO_2$.

BRIEF DESCRIPTION OF THE DRAWINGS

The invention will be described with reference to the accompanying drawings, wherein:

FIGS. 1 and 2 are flow charts for producing silicon nitride sintered bodies according to the invention, respectively.

DESCRIPTION OF THE PREFERRED EMBODIMENTS

Figure 1:
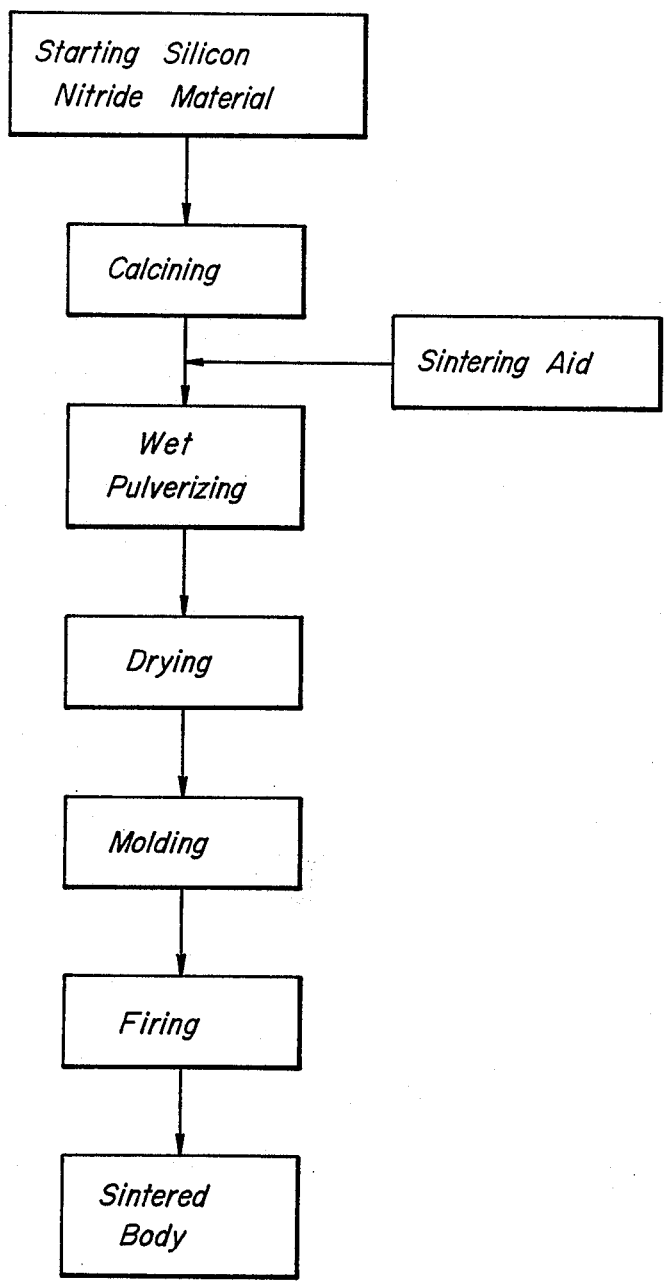

According to the invention, the adjusted silicon nitride powder having an oxygen content within a given range is employed to produce a silicon nitride sintered body having a relatively large oxygen content, whereby high oxidation resistance and high-temperature strength can be obtained. In general, as the oxygen content in the sintered body becomes large, the oxidation resistance becomes better, but when the oxygen content is too large, the high-temperature strength of the resulting sintered body is reduced because the intergranular phase is not crystallized. Therefore, according to the invention, the silicon nitride powder is adjusted so as to have an oxygen content of 4.5-7.5% by weight as converted into $SiO_2$ before the molding and firing, whereby there is obtained a silicon nitride sintered body having a molar ratio of metal ion (M) except Si contained in the sintered body to oxygen ion (O) within a range of $M:O = 1:2 \sim 1:3$. Here, the reason why the oxygen content in the silicon nitride powder according to the invention is represented by the amount of $SiO_2$ is due to the fact that it is difficult to actually define only the oxygen content considering the amounts of sintering aid and impurity.

The reason why the oxygen content of the silicon nitride powder is limited to a range of 4.5-7.5% by weight as converted into $SiO_2$ is due to the fact that when the oxygen content is less than 4.5%, the intergranular crystal phase is apt to be easily oxidized, while when it exceeds 7.5%, the glass phase is not crystallized at the grain boundary and thus the high-temperature strength is decreased.

In order to make the oxygen content of the starting silicon nitride powder larger than that of the commercially available starting powder, i.e. in order to obtain the oxygen content of 4.5-7.5 wt% as converted into $SiO_2$, it is preferable to subject the starting silicon nitride powder to a calcination under given conditions or a slurry warming process as mentioned later. The increase of oxygen content at the powder or slurry state is to provide a sintered body having a uniform distribution of oxygen content. That is, it is considered that the oxygen content is increased by calcining the shaped body of the silicon nitride powder, but in this case, only the surface of the shaped body is oxidized and the interior of the shaped body is not fully oxidized. On the other hand, when the silicon nitride powder is oxidized by the calcination or slurry warming process, the diffusion and dispersion of air or water are fully performed to progress the uniform oxidation reaction, so that uniform shaped body and sintered body can be obtained by subsequent steps.

In order to improve the oxidation resistance by the increase of the oxygen content, it may be considered to add $SiO_2$ powder to the starting silicon nitride powder.

In this case, however, the mixing of the starting powder with $SiO_2$ powder is not well performed because $SiO_2$ powder is poor in the dispersibility and is apt to be agglomerated. On the other hand, when the oxygen content is increased by the calcination or slurry warming process, $SiO_2$ layers are formed in the starting silicon nitride powder, so that the dispersibility of $SiO_2$ is good.

According to the invention, the silicon nitride sintered body is produced as follows. At first, the commercially available silicon nitride powder is adjusted to have an oxygen content of 4.5-7.5% by weight as converted into $SiO_2$, which is then mixed with a sintering aid containing Y as an essential component, i.e. $Y_2O_3$. Such an adjustment of the silicon nitride powder is carried out by calcining the commercially available silicon nitride powder at a temperature of 800°-1200° C. for a given time before or after the addition of the sintering aid, or by warming a slurry of the commercially available silicon nitride powder at a temperature of 50°-150° C. for a time of 6 hours to 1 day or after the addition of the sintering aid. The mixing of the adjusted silicon nitride powder with the sintering aid is preferably performed by using wet-type attrition mill, ball mill, oscillation mill or the like.

In the invention, the reason why the calcining temperature is limited to 800°-1200° C. is due to the fact that when the temperature is lower than 800° C., the starting powder is not oxidized and the given oxygen content can not be obtained, while when it exceeds 1200° C., the starting powder is extremely oxidized and the given oxygen content can not also be obtained. On the other hand, the reason why the warming temperature is limited to 50°-150° C. is due to the fact that when the temperature is lower than 50° C., the oxidation reaction is not caused, while when it is higher than 150° C., the slurry is dried to cause no reaction.

Then, the resulting powdery mixture is dried by a spray drying process or the like and thereafter molded into a desirable shaped body by a rubber press process, an injection molding process or the like. Next, the resulting shaped body is fired at an elevated temperature, preferably 1650°-1800° C. to obtain a silicon nitride sintered body having high oxidation resistance and high-temperature strength. Thus, silicon nitride sintered bodies having high oxidation resistance and high-temperature strength, wherein the molar ratio of metal ion (M) except Si contained in the sintered body to oxygen ion (O) is within a range of M:O=1:2~1:3 and crystals of $YSiO_2N$ form considerably degrading the oxidation resistance and identified by the X-ray diffraction pattern according to JCPDS Card 31-1462 is not substantially contained, can be obtained by starting from the adjusted silicon nitride powder containing the given amount of $SiO_2$.

Moreover, it is favorable that Mg, Ce are further added to the sintering aid containing Y as the essential component. Because, the addition of Mg facilitates the firing of the shaped body and the addition of Mg+Ce more facilitates the firing of the shaped body.

The following examples are given in the illustration of the invention and are not intended as limitations thereof.

EXAMPLES 1-6, COMPARATIVE EXAMPLES 1-3

A silicon nitride sintered body was produced according to a flow chrt shown in FIG. 1.

At first, a commercially available silicon nitride powder was calcined under conditions shown in Table 1 to increase an oxygen content thereof, which was then pulverized in a wet-type attrition mill together with a sintering aid containing Y as an essential component and including proper amounts of Mg, Ce to obtain a powdery mixture having a chemical composition as shown in Table 1. Then, the resulting powdery mixture was dried by a spray drying process and molded into a rectangular shaped body of 60×60×7 mm by a rubber press process. Thereafter, the resulting shaped body was fired at 1750° C. in $N_2$ gas atmosphere to obtain a silicon nitride sintered body.

The molar ratio of metal ion other than Si to oxygen ion, $SiO_2$ content contained in the sintered body, four-point bending strength at 1200° C. by a method of testing a bending strength of fine ceramics according to JIS R-1601 and presence of breakage after the holding at 800° C. for 100 hours as an oxidation resistance were measured with respect to the resulting silicon nitride sintered body to obtain results as shown in Table 1. In the column "Oxidation resistance" of Table 1, mark O shows no breakage after the holding at 800° C. for 100 hours, and mark X shows the occurrence of breakage within 100 hours during the holding at 800° C.

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| Chemical composition (wt %) | | | | | | | | | |
| $Si_3N_4$ | 89 | 90 | 87 | 85 | 90 | 81 | 85 | 85 | 85 |
| $Y_2O_3$ | 8 | 8 | 5 | 8 | 6 | 9 | 8 | 8 | 8 |
| MgO | 2 | 2 | 7 | 2 | 4 | 0 | 2 | 2 | 2 |
| $CeO_2$ | 1 | 0 | 1 | 5 | 0 | 0 | 5 | 5 | 5 |
| Calcining conditions | | | | | | | | | |
| temperature (°C.) | 1000 | 900 | 1000 | 1000 | 1050 | 1000 | 600 | —* | 1400 |
| time (hr) | 2 | 3 | 2 | 2 | 2 | 2 | 2 | —* | 2 |
| O/M | 2.3 | 2.1 | 2.4 | 2.5 | 2.8 | 2.2 | 1.9 | 1.9 | 3.5 |
| $SiO_2$ content (wt %) | 5.8 | 6.0 | 6.2 | 6.1 | 6.8 | 6.0 | 4.0 | 3.8 | 8.3 |
| Oxidation resistance | O | O | O | O | O | O | X | X | O |
| Strength at 1200° C. (kg/cm$^2$) | 60 | 65 | 70 | 70 | 65 | 60 | 65 | 70 | 30 |

*not treated

As seen from the results of Table 1, all of the sintered bodies according to the invention have high oxidation resistance and high-temperature strength, while the sintered bodies not satisfying even one of conditions defined in the invention have neither oxidation resistance nor high-temperature strength.

EXAMPLES 7-10, COMPARATIVE EXAMPLES 4-6

A silicon nitride sintered body was produced according to a flow chart shown in FIG. 2.

At first, a commercially available silicon nitride powder was pulverized in a wet-type attrition mill together with a sintering aid containing Y as an essential component and including proper amounts of Mg, Ce to form a slurry, which was held at a temperature shown in Table 2 for a given time (water adjustment of slurry) to obtain a powdery mixture at a slurry state having a chemical composition as shown in Table 2. Then, the powdery mixture was dried by a spray drying process and molded into a rectangular shaped body of 60×60×7 mm by a rubber press process. Thereafter, the shaped body was fired at 1750° C. in $N_2$ atmosphere to obtain a silicon nitride sintered body.

The molar ratio of metal ion to oxygen ion, $SiO_2$ content, four-point bending strength and oxidation resistance were measured with respect to the resulting silicon nitride sintered body in the same manner as described in Example 1 to obtain results as shown in Table 2.

TABLE 2

|  | Example |  |  |  | Comparative Example |  |  |
|---|---|---|---|---|---|---|---|
|  | 7 | 8 | 9 | 10 | 4 | 5 | 6 |
| Chemical composition (wt %) | | | | | | | |
| $Si_3N_4$ | 89 | 85 | 85 | 85 | 85 | 85 | 85 |
| $Y_2O_3$ | 8 | 8 | 8 | 8 | 8 | 8 | 8 |
| MgO | 2 | 2 | 2 | 2 | 2 | 2 | 2 |
| $CeO_2$ | 1 | 5 | 5 | 5 | 5 | 5 | 5 |
| Warming conditions of slurry | | | | | | | |
| temperature (°C.) | 110 | 110 | 80 | 110 | 30 | 200 | —** |
| time (hr) | 16 | 16 | 24 | 24 | 16 | *unclear | — |
| O/M | 2.1 | 2.2 | 2.2 | 2.3 | 1.9 | 1.9 | 1.9 |
| Oxygen content as converted into $SiO_2$ (wt %) | 4.8 | 5.1 | 5.3 | 5.5 | 4.1 | 4.0 | 3.8 |
| Oxidation resistance | O | O | O | O | X | X | X |
| Strength at 1200° C. (kg/cm$^2$) | 60 | 65 | 60 | 60 | 65 | 60 | 65 |

*The treating time is unclear because the slurry is dried.
**—: not treated

As seen from the results of Table 2, all of the sintered bodies according to the invention have high oxidation resistance and high-temperature strength, while the sintered bodies not satisfying even one of the conditions defined in the invention have neither oxidation resistance nor high-temperature strength.

As mentioned above, according to the invention, silicon nitride powder is adjusted so as to have an oxygen content larger than that of the conventionally used powder as a starting material for the production of the silicon nitride sintered body, so that silicon nitride sintered bodies having high oxidation resistance and high-temperature strength can be obtained by starting from such an adjusted silicon nitride powder.

What is claimed is:

1. A silicon nitride sintered body produced by using a sintering aid containing Y as an essential component, added to at least about 80 wt. % silicon nitride powder, said sintered body having a molar ratio of metal ions (M), other than Si ions, contained in the sintered body to oxygen ions (O) contained in the sintered body within a range of M:O=1:2~1:3, and containing substantially no crystalline phase of a $YSiO_2N$ form, said phase being identified by an X-ray diffraction pattern according to JCPDS Card 31-1462.

2. A silicon nitride sintered body according to claim 1, wherein said sintering aid further contains Mg.

3. A silicon nitride sintered body according to claim 1, wherein said sintering aid further contains Mg and Ce.

4. A method of producing silicon nitride sintered bodies, comprising the steps of:
   (a) preparing a powdery mixture of at least about 80 wt. % silicon nitride powder adjusted so as to have an oxygen content of 4.5-7.5% by weight as converted into $SiO_2$ and a sintering aid consisting essentially of Y as an essential component;
   (b) molding the powdery mixture into a shaped body; and
   (c) firing the shaped body in a nitrogen of inert gas atmosphere to form a silicon nitride sintered body having a molar ratio of metal ions (M), other than Si ions, contained in the sintered body to oxygen ions (O) contained in the sintered body within a range of M:O=1:2~1:3 and containing substantially no crystalline phase of a $YSiO_2N$ form, said phase being identified by an X-ray diffraction pattern according to JCPDS Card 31-1462.

5. A method according to claim 4, wherein said preparing step is performed by calcining a starting silicon nitride powder in air at a temperature of 800°-1200° C. and wet pulverizing said powder together with said sintering aid.

6. A method according to claim 4, wherein said preparing step is performed by mixing a starting silicon nitride powder with said sintering aid and then calcining the resulting mixture in air at a temperature of 800°-1200° C.

7. A method according to claim 4, wherein said preparing step is performed by wet pulverizing a starting silicon nitride powder together with said sintering aid to form a slurry and warming the resulting slurry at a temperature of 50°-150° C.

8. A method according to claim 4, wherein said preparing step is performed out by wet pulverizing a starting silicon nitride powder with water to form a slurry, warming the resulting slurry at a temperature of 50°-150° C. and then mixing the warmed slurry with said sintering aid.

9. A method according to claim 4, wherein said sintering aid further contains Mg.

10. A method according to claim 4, wherein said sintering aid further contains Mg and Ce.

11. A silicon nitride powder starting material comprising an oxygen content of 4.5-7.5% by weight as converted into $SiO_2$.

12. A silicon nitride powder starting material according to claim 11, wherein said powder contains an $SiO_2$ layer on its surface.

* * * * *